(12) United States Patent
McGowan

(10) Patent No.: US 7,824,464 B2
(45) Date of Patent: Nov. 2, 2010

(54) CALCIUM ALUMINATE CLINKER AS A REFRACTORY AGGREGATE WITH AND WITHOUT BARIUM ADDITION AND USE THEREOF

(76) Inventor: Kenneth A. McGowan, 344 Raymaley Rd., Harrison City, PA (US) 15636

(*) Notice: Subject to any disclaimer, the term of this patent is extended or adjusted under 35 U.S.C. 154(b) by 661 days.

(21) Appl. No.: 11/899,128

(22) Filed: Sep. 4, 2007

(65) Prior Publication Data

US 2008/0061465 A1    Mar. 13, 2008

Related U.S. Application Data

(62) Division of application No. 10/924,713, filed on Aug. 24, 2004, now Pat. No. 7,368,010.

(60) Provisional application No. 60/497,998, filed on Aug. 25, 2003.

(51) Int. Cl.
  *C21B 7/06* (2006.01)
(52) U.S. Cl. .................. 75/301; 266/280; 266/284; 264/333; 106/692
(58) Field of Classification Search .......... 75/301; 266/280, 284; 264/333; 106/692
  See application file for complete search history.

(56) References Cited

U.S. PATENT DOCUMENTS

| | | | |
|---|---|---|---|
| 3,944,426 A * | 3/1976 | Nickelsen et al. | 106/765 |
| 4,162,923 A | 7/1979 | Schmitt et al. | |
| 4,798,628 A | 1/1989 | Mills et al. | |
| 4,946,505 A | 8/1990 | Jungk | |
| 5,071,484 A | 12/1991 | Bonifay et al. | |
| 5,108,510 A | 4/1992 | Burge et al. | |
| 5,356,472 A | 10/1994 | Odler | |
| 5,851,282 A | 12/1998 | Odler | |
| 6,730,159 B1 | 5/2004 | Falaschi et al. | |

FOREIGN PATENT DOCUMENTS

| | | |
|---|---|---|
| CN | 1546409 | 11/2004 |
| DE | 3020896 | 12/1981 |
| JP | 06115986 | 4/1994 |
| JP | 2004299972 | 10/2004 |

OTHER PUBLICATIONS

Kopanda et al. (Aluminum Company of America) "Production Processes, Properties, and Applications for Calcium Aluminate Cements", Alumina.
Chemical Science and Technology Handbook, Am. Ceram. Sci., pp. 171-183 (1990).

* cited by examiner

*Primary Examiner*—Paul Marcantoni
(74) *Attorney, Agent, or Firm*—Craig G. Cochenour; Buchanan Ingersoll & Rooney PC

(57) ABSTRACT

The present invention provides for a refractory aggregate composition comprising an improved calcium aluminate clinker having the formula $C_nA_x$ wherein C is calcium oxide and A is aluminum oxide, wherein n is an integer from about 1 to about 12, wherein x is an integer from about 1 to about 24, and wherein said clinker has from zero to less than about fifty weight percent $C_{12}A_7$. Analogs, derivatives and hydrates of the improved calcium aluminate clinker are provided. A refractory composition and a sprayable refractory composition are disclosed comprising the improved calcium aluminate clinker. A method for improving the insulating character and/or penetration resistance of a liner in contact with molten aluminum in an aluminum manufacturing process or during aluminum transport is provided.

24 Claims, 4 Drawing Sheets

System $CaO-Al_2O_3$; high alumina portion.

System CaO–Al₂O₃. C = CaO; A = Al₂O₃.
F. M. Lea and C. H. Desch, The Chemistry of Cement and Concrete, 2d ed., p. 52. Edward Arnold & Co., London, 1956.

System BaO–CaO–Al₂O₃; subsolidus at 1250°C. A = Al₂O₃, B = BaO, and C = CaO.

C. Brisi and M. A. Montorsi, *Ann. Chim. (Rome)*, 52, 792 (1962).

System BaO-CaO-Al₂O₃; subsolidus at 1400°C. A = Al₂O₃, B = BaO, and C = CaO.
Franco Massazza, *Ann. Chim. (Rome)*, 53, 1016 (1963).

CALCIUM ALUMINATE CLINKER AS A REFRACTORY AGGREGATE WITH AND WITHOUT BARIUM ADDITION AND USE THEREOF

BENEFIT OF PRIOR PATENT APPLICATIONS

This utility patent application is a divisional application of and claims the benefit of co-pending prior U.S. Utility patent application Ser. No. 10/924,713, filed on Aug. 24, 2004, which claims the benefit of U.S. Provisional Patent Application Ser. No. 60/497,998 (now abandoned), filed Aug. 25, 2003, entitled "Calcium Aluminate Clinker As A Refractory Aggregate With And Without Barium Addition And Use Thereof" having the same named applicant as inventor, namely, Kenneth A. McGowan. The entire contents of U.S. Provisional Patent Application Ser. No. 60/497,998 and U.S. Utility patent application Ser. No. 10/924,713 are incorporated by reference into this divisional utility patent application.

BACKGROUND OF THE INVENTION

1. Field of the Invention

The use of calcium aluminate clinker as a refractory aggregate in shapes and castables. The present invention provides an improved refractory aggregate based on $CaO.Al_2O_3$ clinker (hereinafter referred to as "CA" clinker and designated by the following equation $C_nA_x$, wherein preferably n is an integer from about 1 to 12 and x is an integer from about 1-24) and $C_nA_x$, hydrate phases and analogs or derivatives thereof including those based on barium substitution for calcium or barium additions resulting in calcium substitution after chemical reaction and/or heat treatment, all of which are referred to herein as CA clinker. Refractory materials based on aggregate compositions having these phases singularly or combined, and exclusive of $C_{12}A_7$ as a major phase, are provided in the present invention.

2. Description of the Background Art

Lafarge Calcium Aluminates Inc. (Maryland, USA) markets a calcium aluminate clinker as an aggregate available under their "r50" trade name. This clinker known by those skilled in the art is about 52% alumina and is dense. The presence of a relatively large amount of $C_{12}A_7$ causes the LaFarge Calcium Aluminates, Inc.'s calcium aluminate clinker to melt and the product is essentially fused with little or no porosity. Thus, this composition has little utility as a refractory aggregate. The present invention provides a composition comprising a $C_nA_x$, clinker that lacks significant amounts of $C_{12}A_7$ and that has the additional benefit of the presence of porosity and usefulness as a refractory aggregate.

It is known in the refractory arts that the addition of barium-containing materials impart a penetration resistance to materials in contact with molten aluminum. In another embodiment of the present invention, compositions are provided wherein barium is substituted into the CA clinker matrix of the present invention resulting in $BA_6$, $BC_2A_4$ and the other analogs that increase the performance of the product and resist aluminum penetration to a great degree.

A primary area of application for the compositions of the present invention is in contact with molten aluminum. Because aluminum has such a low viscosity in the molten state, it easily penetrates the refractory used to contain it. This causes the refractory to wear. In addition, penetration of the refractory causes the freeze plane to move further into the refractory lining thereby allowing molten aluminum to penetrate further. Ideal materials are those that resist aluminum penetration and are insulating enough to have the freeze plane as close as possible to the hot face or contact face of the refractory lining. Current technology relies on the addition of penetration inhibitors that work either by reducing the porosity of the refractory, which can result in moving the freeze plane further into the lining, or by changing the wetting angle of the aluminum on the refractory. Well known examples of these penetration inhibitors are fluorospar and barium sulfate, respectively. Other ways of reducing penetration known by those skilled in the art involve the use of increasingly pure alumina as an aggregate and making this material as dense as possible to reduce open porosity and hence penetration. This increases the conductivity of the material and pushes the freeze plane into the backup refractory lining in most typical configurations known by those skilled in the art.

Therefore, in spite of the background art, there remains a very real and substantial need for a refractory composition and a refractory aggregate composition having the improved calcium aluminate clinker, and a sprayable and/or castable refractory composition, for use, such as for example, but not limited to, as a refractory lining in the production of molten aluminum.

SUMMARY OF THE INVENTION

The present invention provides a refractory aggregate composition comprising a calcium aluminate clinker having the formula $C_nA_x$ wherein C is calcium oxide and A is aluminum oxide, wherein n is an integer from about 1 to about 12, wherein x is an integer from about 1 to about 24, and wherein said clinker has less than about fifty weight percent $C_{12}A_7$, and preferably less than about 10 weight percent. In other embodiments of the refractory aggregate composition of this invention, as described herein, the aggregate includes a hydrate phase of the $C_nA_x$, analogs of the $C_nA_x$, and derivatives of the $C_nA_x$.

In another embodiment of the present invention, the refractory aggregate composition, as described herein, includes wherein barium is substituted for calcium in the calcium aluminate clinker.

In yet another embodiment of the present invention, the refractory aggregate composition, as described herein, further comprises a source of barium. The refractory aggregate composition, preferably, includes wherein the barium source addition results in the formation of analogs and derivatives of said $C_nA_x$ and optionally hydrates of said $C_nA_x$. More preferably, the refractory aggregate, as described herein, includes wherein the barium is present in one or more phases as BaO, $BA_6$, and $C_2BA_4$, and combinations thereof.

In another embodiment of the refractory aggregate composition of the present invention as described herein, the alumina content of the calcium aluminate clinker is greater than or equal to sixty eight weight percent.

Another embodiment of the present invention provides for the refractory aggregate composition, as described herein, further comprising a calcium aluminate cement.

An improved calcium aluminate clinker, is provided, of the type having the formula $C_nA_x$, wherein C is calcium oxide and A is aluminum oxide, wherein n is an integer from about 1 to about 12, and x is an integer from about 1 to about 24, the improvement comprising limiting the concentration of a $C_{12}A_7$ phase to less than about fifty percent $C_{12}A_7$. Preferably, the improved calcium aluminate clinker includes one or more of a hydrate phase of the $C_nA_x$, includes analogs of the $C_nA_x$, and includes derivatives of the $C_nA_x$.

In another embodiment of this invention, the improved calcium aluminate clinker, as described herein, includes wherein barium is substituted for calcium in the calcium aluminate clinker.

In another embodiment of this invention, the improved calcium aluminate clinker, as described herein, further comprising a source of barium. Preferably, the improved calcium aluminate clinker includes wherein the barium source addition results in the formation of analogs and derivatives of the $C_nA_x$, and optionally hydrates of the $C_nA_x$. More preferably, the improved calcium aluminate clinker includes wherein the barium is present in one or more phases as BaO, $BA_6$, and $C_2BA_4$, and combinations thereof.

Another embodiment of the present invention provides a refractory composition comprising a refractory aggregate comprising a calcium aluminate clinker having the formula $C_nA_x$, wherein C is equal to calcium oxide, wherein A is equal to aluminum oxide, wherein n is an integer from about 1 to about 12, wherein x is an integer from about 1 to about 24, and wherein said calcium aluminate clinker has less than about fifty percent $C_{12}A_7$, and a calcium aluminate cement. Preferably the refractory composition of the present invention, as described herein, further comprises water in a sufficient amount to achieve a castable consistency. The refractory composition includes in other embodiments the refractory aggregate compositions as described herein. The refractory composition, as described herein, includes wherein the refractory aggregate further comprises one or more of a reactive alumina, a calcined alumina, tabular alumina, and bubble alumina, and a lightweight calcium alumina aggregate, and combinations thereof. In a more preferred embodiment, the refractory composition of the present invention further comprises a surfactant. In a more preferred embodiment of the refractory composition of the present invention, the refractory composition further comprises a fibrous material. In a most preferred embodiment of the present invention, the refractory composition further comprises a surfactant and a fibrous material. The refractory composition of this invention further comprises water in an amount sufficient to achieve a castable consistency.

Another embodiment of this invention provides wherein the refractory aggregate composition and the calcium aluminate clinker, as described herein, may be formed by sintering or by employing a fusion process.

Another embodiment of this invention provides a sprayable refractory composition comprising: (a) a pumpable first component comprising (i) a refractory composition, as described herein, comprising a refractory aggregate comprising a calcium aluminate clinker having the formula $C_nA_x$, wherein C is equal to calcium oxide, wherein A is equal to aluminum oxide, wherein n is an integer from about 1 to about 12, wherein x is an integer from about 1 to about 24, and wherein the calcium aluminate clinker has less than fifty percent $C_{12}A_7$, and a calcium aluminate cement, (ii) a dispersant, and water in an amount sufficient to achieve a pumpable consistency, and optionally (b) a second component comprising a flocculating agent, wherein the second component is added to the first component for achieving installation of the sprayable refractory composition. The sprayable refractory composition, as described herein, includes wherein the refractory composition includes a hydrate phase of $C_nA_x$, includes analogs of $C_nA_x$, and includes derivatives of $C_nA_x$.

The sprayable refractory composition includes the refractory composition and refractory aggregate composition as described herein.

DETAILED DESCRIPTION OF THE INVENTION

Figure 1:
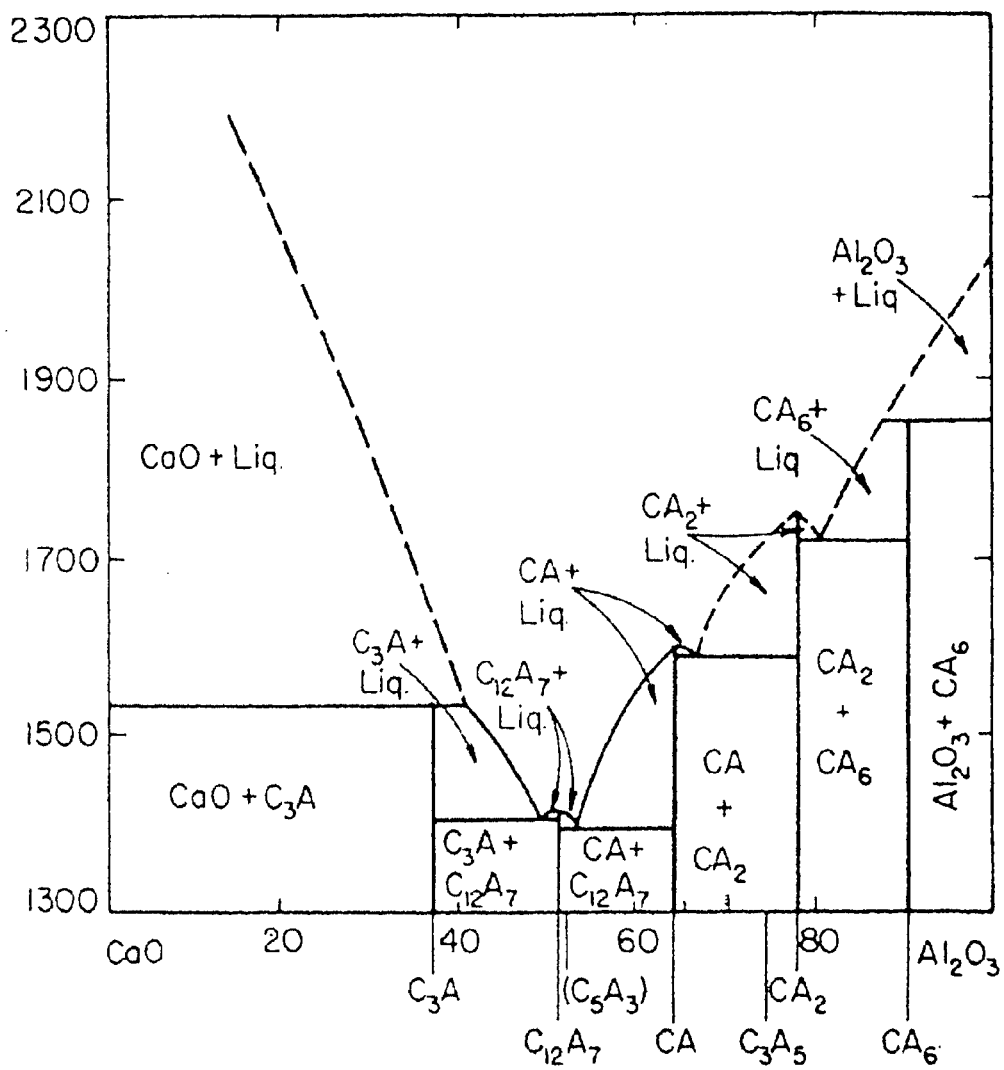
FIG. 1 shows a phase diagram that sets forth the CaO—$Al_2O_3$ system. C=CaO, A=$Al_2O_3$. The horizontal axis of FIG. 1 shows molecular formations in the range up to the pure oxide of aluminum or $Al_2O_3$ on the right and pure CaO on the left. The numbers on the horizontal axis represent the percent of $Al_2O_3$ present in the system.

The present invention provides a calcium aluminate (CA) clinker without $C_{12}A_7$ as a major phase and further comprising $Al_2O_3$(A), CA (the discrete compound CaO—$Al_2O_3$, not to be confused with the CA clinker) and $CA_2$ as major phases. There can be other phases present in the clinker such as, for example, $C_3A$, $C_2A_4$, etc. Upon heating, the phases can form $CA_6$. In any case, it is known that these phases, including the $C_{12}A_7$, naturally resist penetration of molten aluminum, to a degree. In a preferred embodiment of this invention, the CA clinkers of the present invention, for example, but not limited to rotary kiln products, have other beneficial features, at alumina contents of about 68% and higher. First, the shape of the aggregate is rounded making it easier to create a free flowing material. Also, because of the raw materials used to make the product, it tends to form into porous spheres. The porosity of the spheres becomes important if an insulation material, as a final product, is desired. When the aggregate is mixed with water, either in a castable product or shape mix, the surface of the aggregate becomes activated and begins to form the expected hydrates. When the set reaction or precipitation reaction occurs, the porosity of the aggregate is sealed off and the aggregate is bonded together through surface contact. The benefit here is a more insulating material that resists penetration. When a large portion of the mix is the same type of material such as the case would be in a castable, the resulting strength of the material is greatly enhanced by the ability of the aggregate and the matrix to bond with each other. In this case, the final material is a true monolith that naturally resists penetration and is insulating in character due to the sealed off porosity of the surface activated CA clinker. Because the CA clinker of the instant invention contains little or no $C_{12}A_7$, the material can be used at elevated temperatures consistent with aluminum manufacturing as well as other processes. The $C_{12}A_7$ is a low melting phase that is common to cements having $Al_2O_3$ contents of 65% and lower. The more preferred CA clinker products of this invention are those with an $Al_2O_3$ content greater than sixty eight percent (68%) by weight in the clinker, as opposed to clinker co-ground with other materials such as additional $Al_2O_3$. Preferably, the CA clinker of the present invention as described herein comprises a concentration of $Al_2O_3$ greater than or equal to about sixty eight percent by weight (68% w/w) based upon the current manufacturing process of calcium aluminate cements known by those persons skilled in the art. This leads to a final composition of the present invention having a minimal $C_{12}A_7$ content. However, from the phase diagrams of FIGS. 1 and 2 it can be seen that upon the formation of the CA and $CA_2$ phases (near 68% $Al_2O_3$) and up to but not including pure $Al_2O_3$, represents the ideal composition of the aggregate. That is CA, $CA_2$, $C_3A_5$, $CA_6$ and $Al_2O_3$ alone or in combination. The present applicant has discovered that CA clinkers containing $C_{12}A_7$ in appreciable amounts are undesirable. Thus, it will be appreciated by those skilled in the art that the concentration of $Al_2O_3$ can be used as a guideline in determining the potential usefulness of the aggregate, however, the determining factor is limiting the presence of low melting phases, in particular $C_{12}A_7$, that ultimately determines the usefulness of the aggregate. The applicant of the present invention has found that $C_{12}A_7$ concentrations of greater than about 3 molar % (Mol %, or M %) would not afford a useful aggregate for applications exceeding 1400 degrees Centigrade but may prove useful at lower temperature applications.

Figure 3:
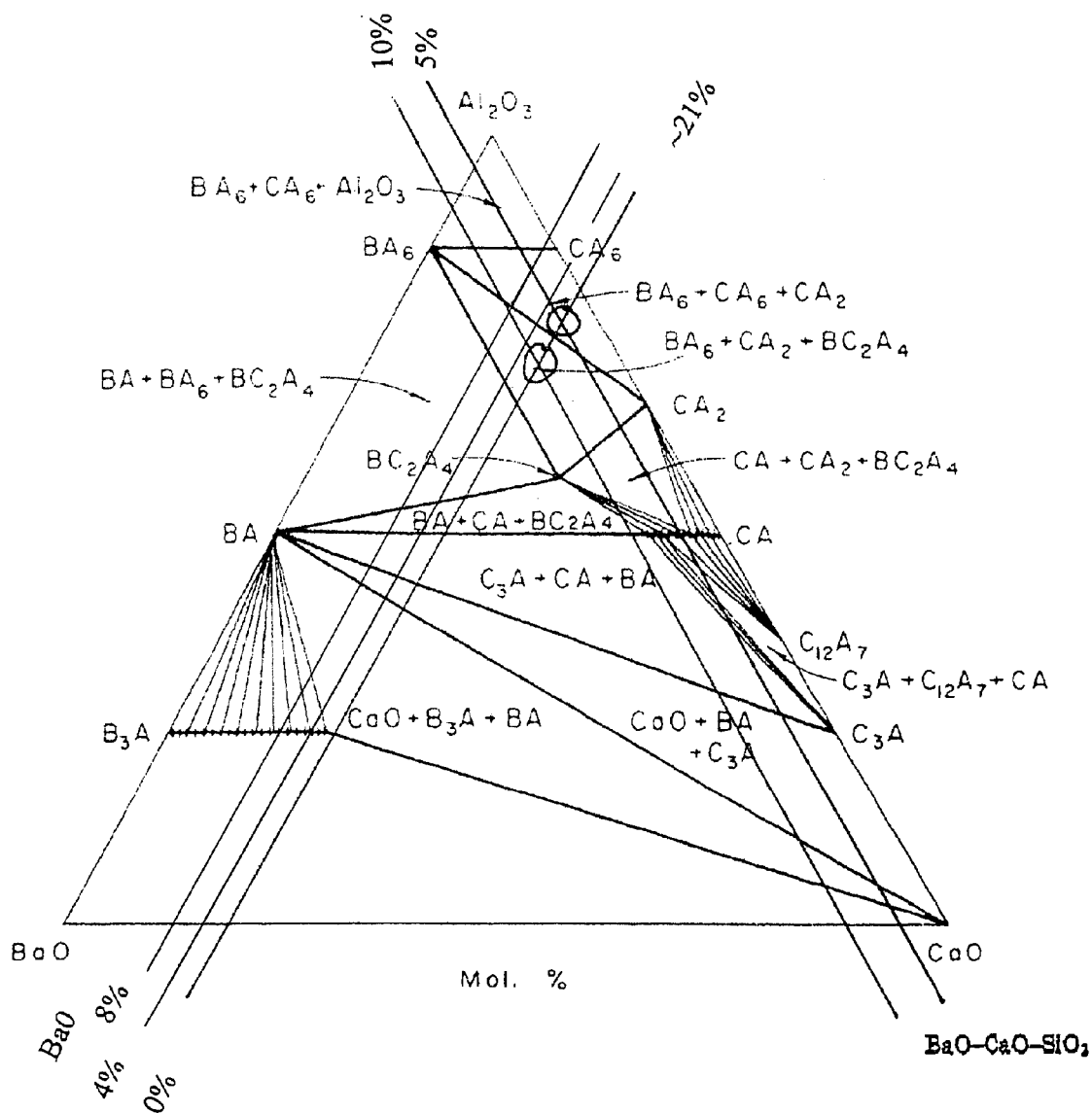
FIG. 3 shows the BaO—CaO—$Al_2O_3$ system containing BaO at 1250 degrees Centigrade.
Figure 4:
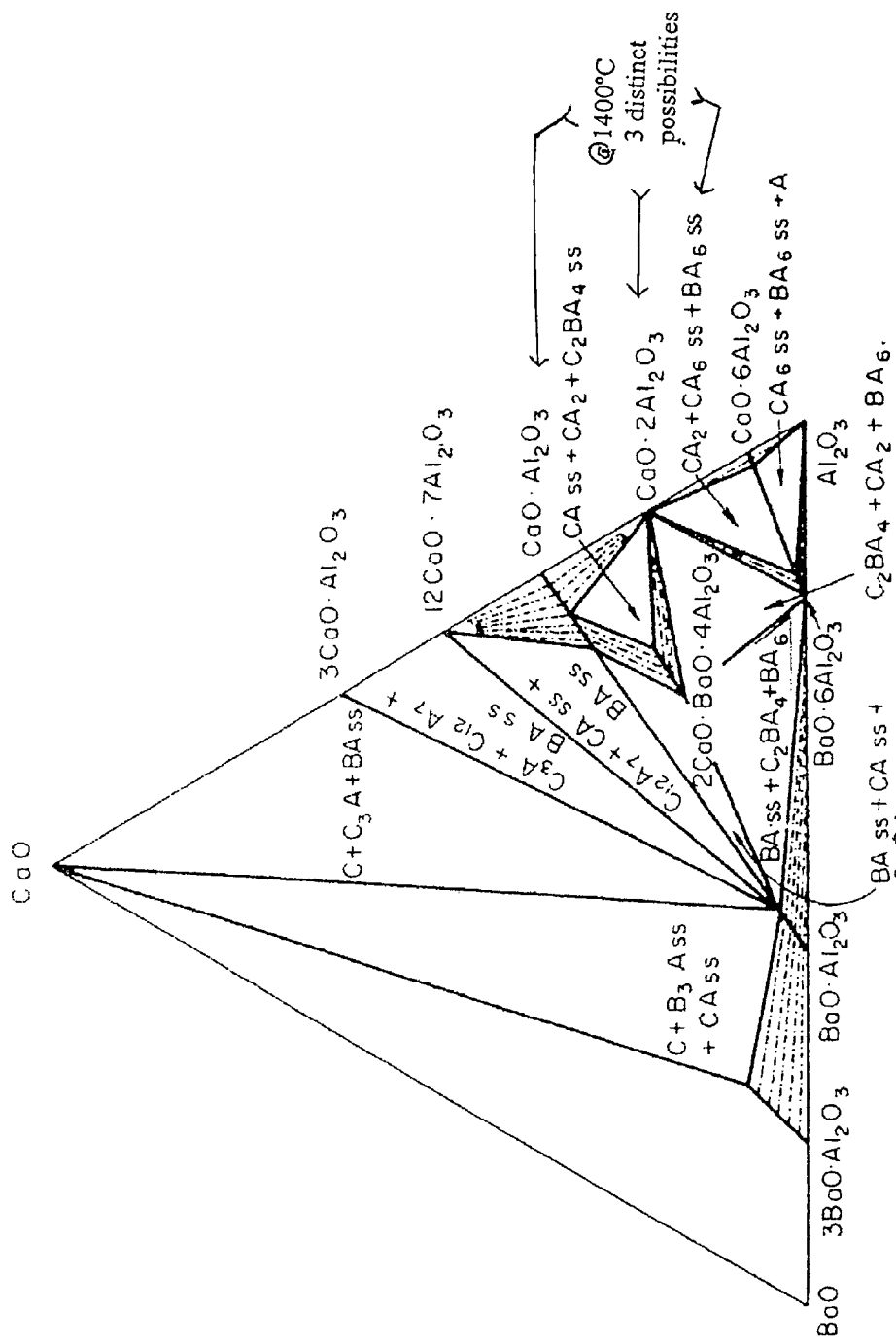
FIG. 4 shows the BaO—CaO—$Al_2O_3$ system containing BaO at 1400 degrees Centigrade.

Another embodiment of this invention provides the CA clinker composition as described herein and wherein the composition further includes the addition of a source of barium (added in a variety of forms such as the carbonate or sulfate salts). If the barium exists in the proper ratio with the CaO(C) and the $Al_2O_3$ (A) one can form $BA_6$, $B_3A$, BA, and $BC_2A_4$ (where B=BaO) with temperature. These are analogs of $CA_6$, $C_3A$, and CA, while $BC_2A_4$ is a derivative (FIG. 3 and FIG. 4). The presence of these phases greatly enhances the ability of the product to resist penetration by not only changing the contact angle of the aluminum, but also forming a solid solution distributed equally throughout the matrix. This is significantly different than the heterogeneous mixtures current technologies have with barium sulfate additions.

Figure 2:
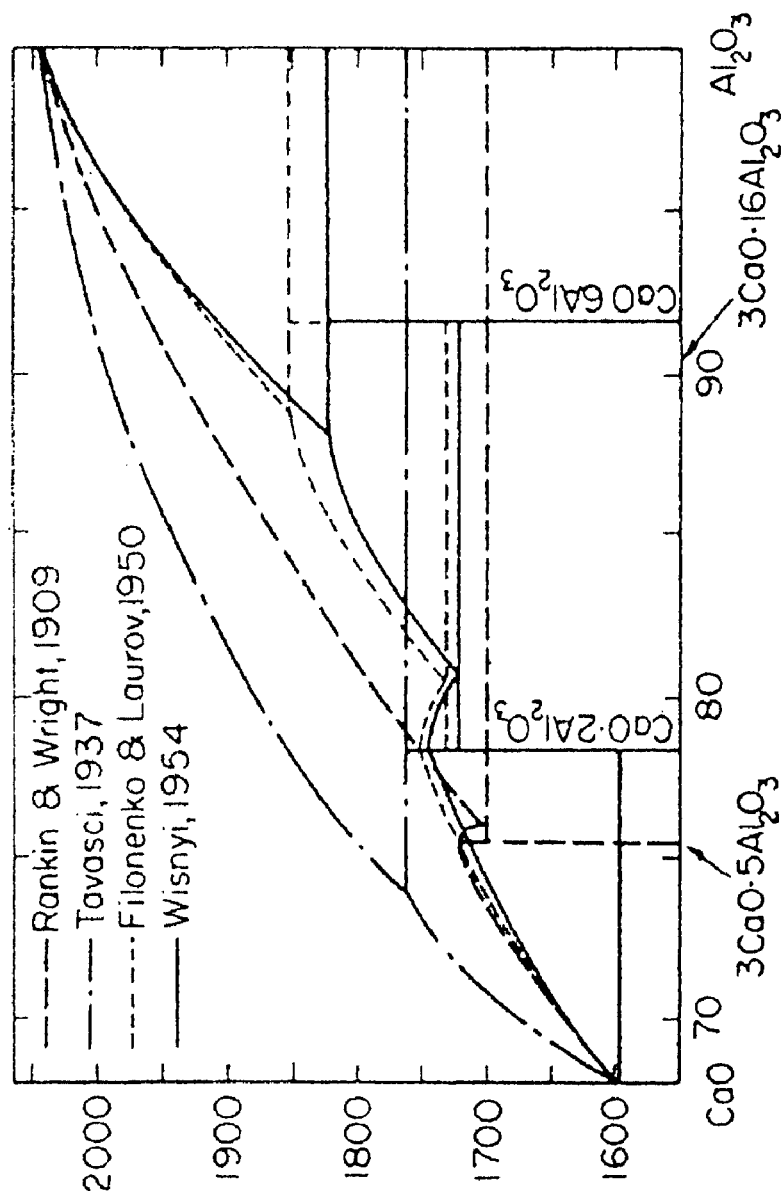
FIG. 2 shows a more detailed description of the higher $Al_2O_3$ portion of FIG. 1.

FIG. 1 shows a phase diagram that sets forth the CaO—$Al_2O_3$ system. The horizontal axis of FIG. 1 shows molecular formations in the range up to the pure oxide of aluminum or $Al_2O_3$ on the right and pure CaO on the left. The numbers on the horizontal axis represent the percent of $Al_2O_3$ present in the system. The resulting solid phases are shown in the boxes set forth in FIG. 1. The temperatures (in degrees Centigrade) at which they are present, and stable, are shown on the vertical axis of FIG. 1. Note that the boxes of FIG. 1 containing the $C_{12}A_7$ solid begin to form liquids (area above the boxes at or near 1400 degrees Centigrade). The effect of the liquid is reduced strength and increased reactivity with the surrounding environment, both of which are detrimental. The diagram of FIG. 1 shows pure CA present at about 68% $Al_2O_3$. From greater than or equal to about 68% $Al_2O_3$ compositions, formed phases are useful as aggregate. FIG. 2 shows a more detailed description of the higher $Al_2O_3$ portion of FIG. 1.

FIGS. 3 and 4 show the BaO—CaO—$Al_2O_3$ systems of the present invention containing BaO at 1250 degrees Centigrade and 1400 degrees Centigrade, respectively. BaO concentrations greater than zero percent that lead to formation of $BA_6$ and $C_2BA_4$ are beneficial. The presence of $C_2BA_4$ (higher concentrations of BaO, via barium sulfate additions as the barium source in the following examples) results in improved penetration resistance.

The calcium aluminate (CA) clinker of the present invention as described herein is a viable aggregate (as compared to a bond matrix) for refractory products. The clinker may comprise all of the aggregate or a portion thereof. This does not include the use of the compound as a discrete bonding matrix such as cement, where it is currently used in a variety of materials. The CA clinker is composed of $C_nA_x$, $C_nA_x$, hydrate, and $Al_2O_3$ phases. It will be appreciated by those persons skilled in the art that commercially available clinker have several impurities present such as for example various iron oxides, silicon oxides, alkali, and alkaline earth compounds, etc. The present applicant has found that the purer the clinker the better will be its temperature resistance, and preferably that the impurities are present in concentrations less that 1%, the clinker will suffice as a useable aggregate. A typical commercially available clinker chemistry is shown here in Table 1 below:

TABLE 1

| Ingredient | Avg. Wt. % |
|---|---|
| $Al_2O_3$ | 69.63 |
| $SiO_2$ | <0.8 |
| $Fe_2O_3$ | <0.5 |
| CaO | 28.12 |
| Others Combined | <0.95 |

It will be appreciated by those skilled in the art that the commercially available clinkers available as set forth in Table 1 will vary from batch to batch and supplier to supplier due to raw material sourcing and other variations.

In the compositions of the CA clinker of the present invention, the presence of $C_{12}A_7$ is limited as a minor constituent such that compositions comprise $Al_2O_3$ contents >68% in reference to the aggregate or clinker. As used herein, the term "major" means at least about 50% or greater. As used herein, the term "minor" means less than about 50%. This does not include co-ground or blended materials whose chemistry can be controlled by addition of discrete diluents. This is important because $C_{12}A_7$ is a low melting phase that limits the maximum operating temperature of the product if present in substantial amounts. The application of the compositions of the present invention is limited to an operational temperature not exceeding about 1820 degrees Centigrade. At this temperature liquid phases form in the pure system. It should be noted that the product will not be a pure system due to impurities present in the clinker.

The CA aggregate or clinker of the present invention may be a sinter product if porosity is desired or a fusion product if porosity is not desired (including partial fusions as a means of controlling porosity). In some cases, such as aluminum contact, porosity is desirable in order to give the working refractory lining greater insulating character. This can move the freeze plane closer to the hot face and therefore allow for a thinner lining if desired. This in turn can allow for increased production or transport capacity of aluminum, for example.

In the present invention the active surface of the aggregate allows these particles to participate in the bonding matrix, particularly at ambient temperature. Although it is true that a cement bonding mix will bind almost any aggregate present, the aggregate itself retains its individuality. It is surrounded by a bond which holds it in place, but does not become part of that bond. The surface of the aggregate and the bonding matrix are essentially identical, in the case of a castable made of the CA clinker of the present invention as the aggregate. Therefore, the aggregate and matrix become one and each component loses its individuality. Indeed no grain boundaries exist in the product made from the composition of the present invention identifying where the matrix ends and the aggregate begins. Only the remaining porosity of the inactivated interior of the aggregate indicates where an independent grain once existed. This results in the beneficial character of closed porosity, if desired, and increase strength of the true monolith. This character is retained as the material dehydrates with temperature.

The addition of barium to the compositions of the present invention improves the enhanced properties even further by reacting to form analogs and derivatives of the $C_nA_x$, and its hydrates, which improve penetration resistance by forming in-situ. FIG. 4 shows a phase diagram that sets forth the compounds of interest that are formed and their physical state at 1400 degrees Centigrade. FIG. 4 shows that at $Al_2O_3$ contents of greater than 68% and with the presence of BaO, Ba can exist in three different forms at this temperature: BaO, which changes the contact angle of aluminum and allows for penetration resistance (current technology), $BA_6$ as a solid or solid solution, and $C_2BA_4$ as a solid or solid solution. The presence of all three of these compounds improve penetration resistance. In a more preferred embodiment of this invention, the compositions include areas of the phase diagram, which can lead to the formation of $BA_6$ and $C_2BA_4$, which greatly improve the penetration resistance in comparison to the addition of BaO (typically as barium sulfate). In a preferred embodiment of this invention, the addition or use of BaO in combination with the CA clinker of this invention for use as an aggregate is provided.

The following are examples of the compositions of the present invention. As used in the examples, CA clinker is as described herein; CAR60 Alumina is calcined alumina and is commercially available from Alcan Chemicals, Pittsburgh, Pa.; A-3000 FL Alumina is a reactive alumina which are ultrafine refractory material about 0.4 micron and 3.0 microns average particle diameter size, respectively, and are greater than or equal to about ninety-nine (99) weight percent aluminum oxide material and is commercially available from Almatis Chemicals, Leetsdale, Pa.; Type 153 fibers are fibrous materials commercially available as "HERCULON 153" polyfibers (Hercules, Incorporated, Wilmington, Del.); and the surfactant may be sodium tripolyphosphate (STPP) (UNIVAR Pittsburgh, Bunola, Pa.); Tabular Alumina is a refractory aggregate having greater than or equal to about ninety-nine (99) weight percent aluminum oxide commercially available from Almatis, Pittsburgh, Pa.; SLA-92 is a CA6 based lightweight (less than 120 pounds/cubic foot density) calcium aluminate aggregate commercially available from Almatis, Pittsburgh, Pa. Bubble Alumina may be made by blowing a stream of high pressure air into molten alumina and is commercially available from Almatis, Pittsburgh, Pa.; and Calcium Aluminate Cement is a 70 percent alumina and 30 percent calcia cement commercially available under the trade name "Secar 71" from LaFarge Calcium Aluminates Inc.

DETAILED COMPOSITIONAL STRATEGY

Example "A"

The following EXAMPLE "A" demonstrates a detailed compositional matrix and the resulting physical properties of the resulting solid body.

Calcium Aluminate clinker of the following chemistry (reported on an oxide basis) was obtained for the study. The material was screened, sized and chemistry was determined on each fraction (see Table I).

TABLE I

| | Fraction | | | |
|---|---|---|---|---|
| | +10 m | 10/28 m | 28/65 m | −65 m |
| Oxide | (concentration in Wt %) | | | |
| SiO2 | 0.44 | 0.29 | 0.22 | 0.25 |
| Al2O3 | 71.59 | 71.21 | 70.35 | 71.19 |
| Fe2O3 | 0.07 | 0.01 | <0.01 | 0.01 |
| CaO | 27.38 | 28.08 | 29.02 | 27.95 |

TABLE I-continued

| | Fraction | | | |
|---|---|---|---|---|
| | +10 m | 10/28 m | 28/65 m | −65 m |
| Oxide | (concentration in Wt %) | | | |
| MgO | 0.27 | 0.22 | 0.21 | 0.31 |
| Na2O | 0.23 | 0.17 | 0.18 | 0.26 |
| K2O | 0.01 | 0.01 | 0.01 | 0.02 |
| P2O5 | 0.01 | 0.01 | 0.01 | 0.01 |

Mineralogical Examination of these fractions showed the following:

| Compound | +10 m | 10/28 m | 28/65 m | −65 |
|---|---|---|---|---|
| | Present | | | |
| CaAl2O4 (CA) | M | M | M | M |
| CaAl4O7 (CA2) | M | M | M | M |
| Ca12Al14O33 (C12A7) | m | m | t | nd |
| Ca3Al2O6 (C3A) | nd | nd | nd | nd |
| Ca5Al6O14 (C5A3) | nd | nd | nd | nd |
| Ca2Al12O5 (C2A) | nd | nd | nd | nd |
| CaAl12O19 (CA6) | nd | nd | nd | nd |
| Ca3Al10O18 (C3A5) | nd | nd | nd | nd |
| CaO (C) | t | t | t | t |
| Al2O3 (A) | t | t | t | t |

M = Major,
m = minor,
t = trace,
nd = not detected

This chemistry and mineralogy is typical for a 70% alumina containing CA cement. CA cements containing greater than 70% alumina can be used. CA cement containing less than 70% alumina can also be used; however, most commercially available products have impurities, which increase in concentration as the alumina content decreases. Common brands of 70% alumina containing CA cement are Almatis' CA14 product and Lafarge's Secar 71 product.

The average open porosity of the CA aggregate is near 53% while the TSG (total specific gravity) averages 2.9 g/cm³ for the lot of aggregate used in this example. Note that batch to batch variation in these products are expected due to the manufacturing process of the CA aggregate.

| COMPOSITION EXAMPLE "A" | |
|---|---|
| Aggregate | Wt % |
| CA +10 m | 15% |
| CA 10/28 m | 30% |
| CA 28/65 m | 10% |
| CA −65 m | 11% |
| CA −325 m | 7% |
| A-2 alumina | 8% |
| A-3000 alumina | 10% |
| A-1000 alumina | 9% |
| STPP (plus addition) | 0.15% |

24% by weight of water was added to give a vibration cast consistency. The material was cast into simple bars in order to determine modulus and crushing strengths. The shape was stripped from the mold in 24 hours and dried at 110° C. (Centigrade). Finally, the shape was fired to a temperature of 1100° C. and allowed to reach thermal equilibrium. The shape was allowed to cool and was tested. The results are as follows:

Apparent porosity=50%
Average pore size=40 microns
Cold crushing strength (ASTM C133)=34.5 MPa
Modulus of Rupture (ASTM C133)=9.3 MPa

Example #1

|  | wt. % |
|---|---|
| Mix Formulation | |
| CA clinker | 70 |
| Secar 71 | 15 |
| CAR 60 Alumina | 5 |
| A-3000FL Alumina | 10 |
| Plus Additions | |
| Type 153 fibers | 0.1 |
| Surfactant | 0.1 |
| Water to cast | 8.5 |

Example #2

|  | wt. % |
|---|---|
| Mix Formulation | |
| CA clinker | 63.3 |
| Secar 71 | 22.3 |
| CAR 60 Alumina | 4.4 |
| A-3000FL Alumina | 10 |
| Plus Additions | |
| Type 153 fibers | 0.09 |
| Surfactant | 0.09 |
| Water to cast | 7.5 |

Example #3

|  | wt. % |
|---|---|
| Mix Formulation | |
| CA clinker | 70 |
| Secar 71 | 25 |
| CAR 60 Alumina | 5 |
| Plus Additions | |
| Type 153 fibers | 0.1 |
| Water to cast | 14 |

Example #4

|  | wt. % |
|---|---|
| Mix Formulation | |
| CA clinker | 67 |
| Secar 71 | 25 |
| Barium Sulfate | 8 |

-continued

|  | wt. % |
|---|---|
| Plus Additions | |
| Type 153 fibers | 0.1 |
| Water to cast | 13.5 |

Example #5

|  | wt. % |
|---|---|
| Mix Formulation | |
| CA clinker | 85% |
| Secar 71 | 15% |
| Plus Additions | |
| Water to cast | 25% |

Example #6

|  | wt. % |
|---|---|
| Mix Formulation | |
| CA clinker | 50 |
| Tabular Alumina | 20 |
| Secar 71 | 25 |
| CAR 60 Alumina | 5 |
| Plus Additions | |
| Water to cast | 12 |

Example #7

|  | wt. % |
|---|---|
| Mix Formulation | |
| CA clinker | 25 |
| Bubble Alumina | 45 |
| Secar 71 | 25 |
| CAR 60 Alumina | 5 |
| Plus Additions | |
| Water to cast | 11 |

Example #8

|  | wt. % |
|---|---|
| Mix Formulation | |
| CA clinker | 71 |
| Secar 71 | 25 |
| Barium Sulfate | 4 |

-continued

|  | wt. % |
|---|---|
| Plus Additions | |
| Type 153 fibers | 0.1 |
| Water to cast | 13.5 |

Example #9

|  | wt. % |
|---|---|
| Mix Formulation | |
| CA clinker | 70 |
| Calcium Aluminate Cement | 15 |
| Calcined Alumina | 5 |
| Reactive Alumina | 10 |
| Plus Additions | |
| Water to cast | 7 |

Example #10

|  | wt % |
|---|---|
| Mix Formulation | |
| CA Clinker | 15 |
| SLA-92 | 60 |
| Cement | 25 |
| Plus Additions | |
| Water to cast | 60 |

These examples show a variety of the compositions of the instant invention having varying CA clinker concentrations. For instance Example #6 would result in a product with greater thermal conductivity compared to Example #3 but Examples #7 and #10 would represent a highly insulating material on comparison. Example #8 is a formulation that results in a product containing $BA_6$ while Example #4 shall form both $BA_6$ and $C_2BA_4$. Example #5 is a highly porous material that has interesting filtration properties.

These examples may be applied via a variety of known installation techniques such as, but not limited to slip casting, vibration casting, pump casting, shape pressing, gunning, and shotcreting. For example, in shotcreting, as understood by those skilled in the art, a dispersant/deflocculation system and optionally the use of a flocculating agent would be employed.

A sprayable refractory composition is provided in another embodiment of this invention comprising: (a) a pumpable first component comprising (i) a refractory composition comprising a refractory aggregate comprising a calcium aluminate clinker having the formula $C_nA_x$, wherein C is equal to calcium oxide, wherein A is equal to aluminum oxide, wherein n is an integer from about 1 to about 12, wherein x is an integer from about 1 to about 24, and wherein said calcium aluminate clinker has less than fifty percent $C_{12}A_7$, and a calcium aluminate cement, (ii) an effective amount of a dispersant, and water in an amount sufficient to achieve a pumpable consistency, and optionally (b) a second component comprising an effective amount of a flocculating agent, wherein the second component is added to the first component for achieving installation of the sprayable refractory composition. The sprayable refractory composition includes wherein the refractory composition includes a hydrate phase of $C_nA_x$. The sprayable refractory composition includes wherein the refractory composition includes analogs of $C_nA_x$. The sprayable refractory composition includes wherein the refractory composition includes derivatives of $C_nA_x$. In another embodiment of this invention, the sprayable refractory composition includes wherein a barium is substituted for calcium in the calcium aluminate clinker.

In yet another embodiment of this invention, the sprayable refractory composition, as described herein, includes wherein the refractory composition further comprises a barium oxide. More preferably, the sprayable refractory composition includes wherein the barium source addition results in the formation of analogs and derivatives of the $C_nA_x$, and optionally hydrates of the $C_nA_x$. The sprayable refractory composition, as described herein, includes wherein the barium is present in one or more phases as BaO, $BA_6$, and $C_2BA_4$, and combinations thereof. Most preferably the barium exists as $BA_6$ and $C_2BA_4$.

In another embodiment of the present invention provides wherein, the sprayable refractory composition, as described herein, includes wherein the refractory aggregate further comprises one or more of a reactive alumina, a calcined alumina, a tabular alumina, and a bubble alumina, a lightweight calcium aluminum aggregate (such as for example but not limited to SLA-92 "type" aggregate), and combinations thereof.

In another embodiment of the sprayable refractory composition, the sprayable refractory composition, as described herein, further includes wherein the refractory composition further comprises a fibrous material.

As used herein, the term "effective amount" refers to that amount of a substance necessary to bring about a desired result, such as for example, the amount of water needed to achieve a consistency suitable for installing the refractory sprayable composition, such as for example, casting, spraying, pumping and combinations thereof.

With respect to the dispersant of the instant invention, it must be able to disperse the constituents of the refractory composition when water is added to the refractory composition. Combinations of dispersants are sometimes desirable depending on the specific constituents of the refractory composition. The dispersants employed in the present invention are those known to those skilled in the art. It will be appreciated by those skilled in the art that other additives may be used in combination with the dispersants of the instant invention to affect the rheology of the refractory composition. Such additives, include such as for example but not limited to, boric acid or citric acid retarders, or lithium carbonate as an example of an accelerator.

With respect to the amount of water used in the refractory composition of the present invention, an effective amount is needed to achieve a castable consistency of the constituents of the refractory composition including the refractory aggregate and dispersant. Typically, the amount of water is from about 1 weight percent to about 80 weight percent for each 100 weight percent of the constituent components of the refractory composition. The use of porous lightweight aggregate, such as SLA-92, may generally increase the water demand. Other examples of lightweight aggregates include, but are not limited to, bubble alumina, expanded clay, perlite, and pyrophylite, known by those skilled in the art.

With respect to the flocculating agent used in the instant invention, any suitable flocculating agent known to those skilled in the art that is suitable for refractory use is may be used. For example, but not limited to, the flocculating agents comprise at least one selected from the group of an alkali chloride, an alkaline-earth chloride, a calcium oxide, and a calcium aluminate.

These examples are not intended to limit the scope of the present invention as described herein. These examples are for purposes of illustration and it will be evident to those persons skilled in the art that numerous variations and details of the instant invention may be made without departing from the instant invention as set forth herein.

I claim:

1. A method for improving the insulating character and/or penetration resistance of a liner in contact with molten aluminum in an aluminum manufacturing process or during aluminum transport, comprising:

lining an aluminum manufacturing and/or processing equipment with a refractory composition comprising a refractory aggregate consisting essentially of a calcium aluminate clinker having the formula $C_nA_x$, wherein C is equal to calcium oxide, wherein A is equal to aluminum oxide, wherein n is an integer from about 1 to about 12, wherein x is an integer from about 1 to about 24, and wherein said calcium aluminate clinker has from zero to less than about fifty weight percent $C_{12}A_7$, and wherein greater than 98 weight percent of said calcium aluminate clinker having a particle size ranging from 325 mesh to +10 mesh, for forming a liner prior to contacting said equipment with molten aluminum and for improving the insulating character and/or penetration resistance of said liner.

2. The method of claim 1 including wherein the refractory aggregate is porous.

3. The method of claim 1 including wherein the refractory aggregate is formed by sintering.

4. The method of claim 1 including wherein the refractory aggregate has little to no porosity.

5. The method of claim 1 including wherein the refractory aggregate is formed by a fusion process.

6. The method of claim 1 including treating said refractory composition with heat to a temperature not exceeding about 1820 degrees Centigrade.

7. The method of claim 1 including wherein the refractory composition includes analogs or derivatives of said $C_nA_x$, and optionally includes wherein barium is substituted for calcium in said calcium aluminate clinker.

8. The method of claim 1 including wherein the refractory composition comprises a source of barium, wherein said barium source is present in one or more phases as BaO, $BA_6$, and $C_2BA_4$, and combinations thereof.

9. The method of claim 6 including wherein the refractory composition comprises a source of barium, wherein said barium source is present in one or more phases as BaO, $BA_6$, and $C_2BA_4$, and combinations thereof.

10. The method of claim 1 including wherein the refractory composition comprises one or more of a reactive alumina, a calcined alumina, a tabular alumina, and a bubble alumina, and combinations thereof.

11. The method of claim 1 including wherein said refractory composition comprises one or more lightweight aggregates.

12. The method of claim 11 including wherein said lightweight aggregate is one or more of a bubble alumina, an expanded clay, a perlite, and a pyrophilite, and combinations thereof.

13. The method of claim 1 including wherein the refractory composition comprises at least one of a surfactant, and a fibrous material, and combinations thereof.

14. The method of claim 1 including wherein said refractory composition comprises a calcium aluminate cement.

15. The method of claim 1 including wherein said refractory composition comprises one or more of a set retarder, and a set accelerator, and combinations thereof.

16. The method of claim 14 including wherein said refractory composition comprises one or more of a reactive alumina, a surfactant, a fibrous material, a set retarder, and a set accelerator, and combinations thereof.

17. The method of claim 1 including adding an effective amount of water to achieve a pressable, castable, pumpable, or sprayable consistency of said refractory composition and for creating a hydrate phase of said $C_nA_x$.

18. The method of claim 17 including wherein said refractory composition comprises a calcium aluminate cement.

19. The method of claim 18 including wherein said sprayable refractory composition comprises a pumpable first component comprising said refractory composition and an effective amount of a dispersant, and said water, and optionally a second component comprising an effective amount of a flocculating agent, wherein said optional second component is added to said pumpable first component for achieving installation of the sprayable refractory composition.

20. The method of claim 19 including employing in combination with said dispersants one or more rheology affecting additives.

21. The method of claim 20 including wherein said rheology affecting additives are one or more of a boric acid retarder, a citric acid retarder, and a lithium carbonate, and combinations thereof.

22. The method of claim 17 including pressing said refractory composition into shape.

23. The method of claim 1 including pressing said refractory composition into shape.

24. The method of claim 1 including employing said refractory composition in a filtration process for molten aluminum.

* * * * *